US012024809B2

(12) United States Patent
Wang

(10) Patent No.: US 12,024,809 B2
(45) Date of Patent: Jul. 2, 2024

(54) LOCK DEVICE AND APPARATUS MOUNTED WITH THE SAME

(71) Applicant: ILLINOIS TOOL WORKS INC., Glenview, IL (US)

(72) Inventor: Yang Wang, Dongguan (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1173 days.

(21) Appl. No.: 16/180,558

(22) Filed: Nov. 5, 2018

(65) Prior Publication Data

US 2019/0178015 A1 Jun. 13, 2019

Related U.S. Application Data

(63) Continuation of application No. 14/372,464, filed as application No. PCT/US2013/021673 on Jan. 16, 2013, now Pat. No. 10,119,312.

(30) Foreign Application Priority Data

Jan. 18, 2012 (CN) ......................... 201210015950.2

(51) Int. Cl.
*E05C 5/00* (2006.01)
*A47L 15/42* (2006.01)
(Continued)

(52) U.S. Cl.
CPC .......... *D06F 37/42* (2013.01); *A47L 15/4259* (2013.01); *E05B 65/00* (2013.01);
(Continued)

(58) Field of Classification Search
CPC ........... E05B 47/0603; Y10T 292/0948; Y10T 292/0951; Y10T 292/0956;
(Continued)

(56) References Cited

U.S. PATENT DOCUMENTS 390,507 A 10/1888 Morton
512,593 A 1/1894 Webster et al.
(Continued)

FOREIGN PATENT DOCUMENTS

CN 1824393 A 8/2006
CN 201288257 Y 8/2009
(Continued)

OTHER PUBLICATIONS

ISR and WO for PCT/US2013/021673 dated Sep. 4, 2013.

*Primary Examiner* — Carlos Lugo
(74) *Attorney, Agent, or Firm* — Pilloff Passino & Cosenza LLP; Martin J. Cosenza

(57) ABSTRACT

The present invention relates to a lock device, comprising a housing including a lock hook mounted in the housing, the lock hook pivotally moves to and away from a lock hook locked position; a locking slider for locking the lock hook, the locking slider having a locking slider first end which abuts against an axial surface of the lock hook, the locking slider is reciprocatingly slideable in a first direction parallel to the lock hook pivoting plane following pivoting of the lock hook to move to or away from a locking slider locked position; a slider locking device for locking the locking slider, the slider locking device is reciprocating slideable in a second direction following the reciprocatingly sliding of the locking slider in the first direction, the second direction crosses the lock hook pivoting plane. The present invention further relates to an apparatus mounted with said lock device.

21 Claims, 6 Drawing Sheets

(51) Int. Cl.
*D06F 37/42* (2006.01)
*E05B 65/00* (2006.01)
*E05C 3/24* (2006.01)
*E05C 19/12* (2006.01)

(52) U.S. Cl.
CPC ................ *E05C 3/24* (2013.01); *E05C 19/12* (2013.01); *E05C 5/00* (2013.01); *Y10S 292/69* (2013.01); *Y10T 292/0948* (2015.04)

(58) Field of Classification Search
CPC ......... Y10T 292/1078; Y10T 292/1083; Y10T 292/1089; Y10T 292/1061; E05C 19/12; Y10S 292/69
See application file for complete search history.

(56) References Cited

U.S. PATENT DOCUMENTS

| | | | | |
|---|---|---|---|---|
| 1,389,339 | A * | 8/1921 | Anderson | E05B 85/24 292/198 |
| 3,040,555 | A * | 6/1962 | Wartian | E05C 3/24 70/97 |
| 4,765,662 | A | 8/1988 | Suska | |
| 5,193,861 | A | 3/1993 | Juga et al. | |
| 5,216,909 | A * | 6/1993 | Armoogam | E05B 47/0002 292/144 |
| 5,362,116 | A | 11/1994 | Doyle et al. | |
| 5,520,424 | A | 5/1996 | Hapke et al. | |
| 6,155,616 | A | 12/2000 | Akright | |
| 6,872,039 | B2 * | 3/2005 | Baus | F16B 21/125 411/347 |
| 7,004,517 | B2 | 2/2006 | Vitry et al. | |
| 7,347,460 | B2 | 3/2008 | Ala | |
| 7,603,880 | B2 | 10/2009 | Chen | |
| 7,770,944 | B2 | 8/2010 | Yuan | |
| 7,789,437 | B2 | 9/2010 | Sheng | |
| 7,866,713 | B2 | 1/2011 | Chen | |
| 8,085,530 | B2 | 12/2011 | Zhang et al. | |
| 8,226,129 | B2 | 7/2012 | Okunaka et al. | |
| 8,360,485 | B2 | 1/2013 | Ma et al. | |
| 8,424,932 | B2 | 4/2013 | Xu et al. | |
| 8,424,933 | B2 | 4/2013 | Xu et al. | |
| 8,733,802 | B2 | 5/2014 | Promutico et al. | |
| 9,107,560 | B2 * | 8/2015 | Bauriedl | A47L 15/4259 |
| 9,624,699 | B2 * | 4/2017 | Rocchitelli | E05C 19/024 |
| 10,119,312 | B2 * | 11/2018 | Wang | E05C 3/24 |
| 2002/0056997 | A1 | 5/2002 | Bassi | |
| 2004/0089033 | A1 | 5/2004 | Lu | |
| 2006/0245160 | A1 | 11/2006 | Zhang et al. | |
| 2007/0108777 | A1 | 5/2007 | Mueller et al. | |
| 2007/0114800 | A1 | 5/2007 | Kuo | |
| 2007/0243457 | A1 | 10/2007 | Viduya et al. | |
| 2007/0274034 | A1 | 11/2007 | Yang et al. | |
| 2010/0270816 | A1 | 10/2010 | Yuan | |
| 2012/0091735 | A1 * | 4/2012 | Ray, II | E05B 65/00 292/140 |
| 2013/0127181 | A1 | 5/2013 | Rocchitelli | |
| 2013/0269403 | A1 * | 10/2013 | Kowalczyk | E05B 47/0603 70/278.7 |
| 2015/0021927 | A1 | 1/2015 | Wang | |

FOREIGN PATENT DOCUMENTS

| | | | | |
|---|---|---|---|---|
| CN | 201334150 | Y | 10/2009 | |
| CN | 102094305 | A | 6/2011 | |
| DE | 2303226 | A1 * | 8/1974 | E05B 47/0603 |
| DE | 19504796 | C2 | 4/1997 | |
| DE | 19837248 | A1 | 2/2000 | |
| DE | 10021839 | A1 * | 11/2000 | E05B 47/0012 |
| EP | 98990 | * | 1/1984 | |
| EP | 0359728 | A2 | 3/1990 | |
| EP | 0483697 | A1 | 5/1992 | |
| EP | 0518147 | A1 | 12/1992 | |
| EP | 1469147 | A2 | 10/2004 | |
| EP | 2087829 | A1 | 8/2009 | |
| EP | 2479364 | A1 * | 7/2012 | D06F 37/42 |
| FR | 2652375 | * | 3/1991 | |
| GB | 346922 | A | 4/1931 | |
| GB | 1178291 | A | 1/1970 | |
| GB | 2397095 | A | 7/2004 | |
| JP | 4674922 | * | 4/2001 | |
| KR | 20100046950 | A | 5/2010 | |
| WO | 9428276 | A1 | 12/1994 | |
| WO | 2004005653 | A1 | 1/2004 | |
| WO | 2007140755 | A1 | 12/2007 | |
| WO | 2011132213 | A1 | 10/2011 | |
| WO | WO-2013181289 | * | 12/2013 | |

* cited by examiner

LOCK DEVICE AND APPARATUS MOUNTED WITH THE SAME

The present application is a Continuation application of U.S. application Ser. No. 14/372,464, filed Jul. 16, 2014, which is a National Stage of PCT/US2013/021673, filed Jan. 16, 2013, which claims priority from China Application No. 2012100159502, filed Jan. 18, 2012, the entire contents of each application being incorporated herein by reference in their entirety.

FIELD OF THE INVENTION

The present invention relates to a lock device, more particularly to a lock used on a door of electrical appliances such as a dish-washer, washing machine, clothes dryer or microwave oven.

BACKGROUND OF THE INVENTION

An electrical appliance such as a dish-washer is usually provided with a door lock. When the door is to be closed, a pushing force is applied to the door, and a door hook is inserted into the door lock and engages with the door lock to lock the door; when the door is to be opened, a pulling force is applied to the door, and the door hook retracts from the door lock and disengages from the door lock.

It is desirable to unlock such door lock from the inside of the washing machine to meet some requirement in use. It is also desirable that such door lock has a certain pulling force that can assist in closing the door and that opening and closing the door needs only a simply pulling/pushing operation without an additional operation such as turning, pinching or buckling so that the door lock is convenient in use and has well hand feeling in manipulation. Furthermore, to reduce cost, it is desirable that the door hook which is used with such kind of door lock has the simplest structure (a one-piece part which is directly fixed to the door) rather than has a removable structure constructed from a plurality of parts.

Usually, such door lock includes a pivotal lock hook and a slider for locking the pivotal lock hook. The lock hook pivots as the door hook inserts in and retracts from the lock hook, and the slider generally reciprocatingly slides in a direction perpendicular to a pivotal plane. When the slider is in a slider locked position, it is able to prevent the lock hook from rotating. When applying pulling force to the door, the lock hook pivots as the door hook retracts from the lock hook thereby applies a force to the slider. The force enables the slider to move away from the slider locking position so that the lock hook can pivot and the door is opened. Such door lock generally further comprises a locking member such as a pawl which locks the slider according to a signal indicative of locking the door lock and which is configured to keep the slider in the slider locked position to prevent the door from being opened during operation of the electrical appliance. According to safety requirements, the door lock must guarantee that during operation of the electrical appliance such as the dish-washer, the door will not be opened as being applied with an external force.

The shortcoming exits in the door lock which has the above functions is it usually has big volume or size, whereas compact figure is usually an important target for the product.

SUMMARY OF THE INVENTION

One object of the present invention is to provide a door lock which has very compact volume and easy to install and arrange.

Another object of the present invention is to provide a door lock which can be unlocked from the inside of the washing machine.

Another object of the present invention is to provide a door lock which has well hand feeling in manipulation and certain assistant pulling force in closing the door, and opening/closing the door with the door lock needs only a simply pulling/pushing operation.

Another object of the present invention is to provide a door lock which needs an immovable door hook with the simplest structure.

Another object of the present invention is to provide a door lock which enables the door to bear a larger pulling force.

The present invention relates to a lock device, comprising a housing including a lock hook mounted in the housing, the lock hook pivotally moves to and away from a lock hook locked position; a locking slider for locking the lock hook, the locking slider having a locking slider first end which abuts against an axial surface of the lock hook, the locking slider is reciprocatingly slideable in a first direction parallel to the lock hook pivoting plane following pivoting of the lock hook to move to or away from a locking slider locked position; a slider locking device for locking the locking slider, the slider locking device is reciprocating slideable in a second direction following the reciprocatingly sliding of the locking slider in the first direction, the second direction crosses the lock hook pivoting plane.

The present invention further relates to an apparatus mounted with said lock device.

One advantage of the present invention is enabling the door of the electrical appliance mounted with the door lock to bear a larger pulling force when locked.

Another advantage of the present invention is, when a very large pulling force is applied to the locked door, not only reducing the force to which the pawl (or other locking members) is subjected but also avoiding generating a force applying to the lock hook parallel to the axial of the lock hook pivoting plane, thereby avoiding causing damages or position deviation to the lock hook.

Another advantage of the present invention is simply and effectively reducing the force to which the pawl (or other locking members) subjected.

The above and other objects, features and advantages of the present invention will become obvious for those skilled in the art after the following specific embodiments and drawings are read.

DETAILED DESCRIPTION OF PREFERRED EMBODIMENTS

Various specific embodiments of the present invention will now be described with reference to the drawings forming a part of the specification. It should be appreciated that although directional terminology such as "front," "rear," "upper" and "lower" are used in the detailed description for the embodiments to describe structural portions and elements of various embodiments of the present invention, use of these terminology is only to facilitate description and these terminologies are used with reference to the orientation of the figure(s). Because the embodiments disclosed herein can be positioned in different orientations, these directional terminologies are used for purpose of illustration and are in no way limiting. Whenever possible, the same or similar reference numbers and symbols are used throughout the drawings to refer to the same parts.

Figure 1:
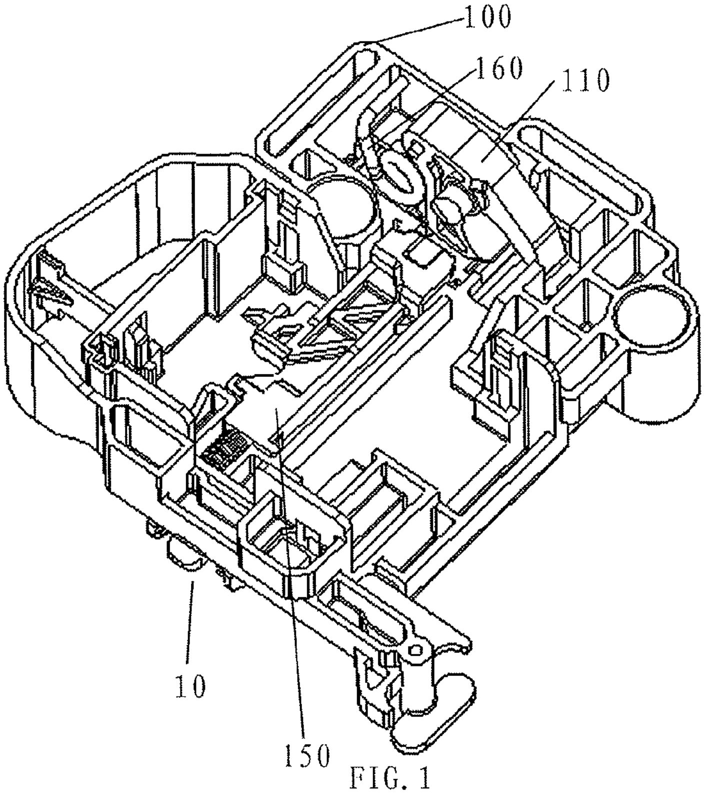
FIG. 1 is a perspective view of a door lock disclosed in the present invention.

FIG. 1 is a perspective view of a door lock 10 in the present invention. A housing 100 is provided with an opening which allows a door hook (not shown) to insert into and retract from the housing 100. The door lock 10 comprises the housing 100 with a pivotal lock hook 110 mounted therein. The door hook which is inserted into the housing cooperates with the lock hook 110. When the door is closed, the door hook is inserted into the housing 100 to engage with the lock hook 110, pushing the lock hook 110 to pivot into a lock hook locking position; whereas when the door is opened, the door hook retracts from the housing 100, pulling the lock hook 110 to pivot to move away from the lock hook locked position. The lock hook 110 is mounted in the housing via a pin and pivots about the pin. An elastic member 160 is mounted on the lock hook 110, bringing a force for driving or blocking the pivoting of the lock hook 110. The elastic member may be a torsion spring as shown in FIG. 1, or may be other elastic members. Because the elastic member 160 acts on the lock hook 110, the lock hook 110 is enabled to rapidly rotate back after passing over the turning point under the external force (i.e. the force applied by closing the door) so as to bring an assistant pulling force. Accordingly, when the door is to be opened, the elastic member is able to generate a resistant force to prevent the door of the washing machine from being accidentally opened. Also, such mechanism is elastic when unlocked so that the door can be opened from inside of the washing machine when it is desired.

In the housing 100 is further mounted a slider locking device 150 for locking a locking slider 130 at a slider locked position. An exemplary slider locking device 150 is a slider, preferably a bar-shaped slider as shown in the figures, but it may also be a locking device in other forms besides the slider.

FIGS. 2*a*, 2*b*, 3*a* and 3*b* show a locking slider 130 mounted in the housing 100 for locking the lock hook 110 at the lock hook locked position. The locking slider 130 is reciprocatingly slideable in a direction parallel to the pivoting plane of the lock hook 110. An end 131*a* of the locking slider 130 abuts against a radial surface 111 of the lock hook 110 to prevent the lock hook 110 from pivoting away from the path of the lock hook locked position. As such, when the locking slider 130 is locked at the slider locked position without being able to slide, the lock hook 110 will not be able to pivot away from the closed position due to the abutment of the locking slider end 131*a*. When the door is opened, the locking slider 130 is in unlocked state, the lock hook 110 pivots away from the lock hook locked position under the action of the door hook and drives the locking slider 130 to slide away from the slider locked position.

At the end 131*a* of the locking slider 130 is provided two lock hook contacting surfaces 138*a* and 138*b* which respectively abuts against the lock hook radial surface 111 when the door lock is locked and opened. At an end 131*b* of the slider 130 opposite to the end 131*a* is provided an elastic member 162.

The elastic member 162 is a spring as shown in the figures, but it may also be other elastic members. One end of the spring 162 abuts against the end 131*b* of the locking slider 130, and the other end of the spring 162 is abutted against by the housing so as to provide a force for driving or blocking the sliding of the locking slider 130.

Alternatively, the locking slider 130 is a bar-shaped slider as shown in the figures, and the extension direction of the main body of the locking slider 130 is parallel to the sliding direction of the locking slider 130 along a straight line, and the sliding direction of the locking slider 130 lies in plane parallel to the pivoting plane of the lock hook 110, which makes the dimension of the door lock more compact.

The slider 150 is located at one side of an axial direction of the lock hook 110, an end 151 of the slider 150 abuts against a side surface 132 of the locking slider 130, and the force applied by the locking slider 130 to the slider 150 enables the slider 150 to reciprocatingly slide as the locking slider 130 slides reciprocatingly. The direction in which the slider 150 reciprocatingly slides crosses the pivoting plane of the lock hook, namely, crosses the sliding direction of the locking slider 130. Preferably, as shown in FIGS. 2*a* and 2*b*, the sliding direction of the slider 150 is perpendicular to the pivoting plane of the lock hook, namely, perpendicular to the sliding direction of the locking slider 130.

Thus it can be seen that via the transfer of the slider 150 and locking slider 130, the rotational movement of the lock hook 110 is converted into linear movement which is in the same direction as the pivot axis of the lock hook 110. By doing so, the door lock is not only easier to control (locking/unlocking the slider 150 by an implementing mechanism or switch box via an extendable or retractable bolt), but also compact in size with a square figuration, which makes it easier to be arranged in use. Conventional door lock configuration makes the entire door lock present a thin bar-shaped appearance so that it has a large longitudinal dimension which is not advantageous for use.

The implementing mechanism or switch box used with the door lock according to the present invention comprises a locking member releasably locking the slider 150 although the locking member is not shown in the figures. An exemplary locking member is a bolt. Accordingly, a notch 158 is provided on the slider 150 to receive the bolt. It should be appreciated that the locking member further includes other means for releasably locking the slider 150, such as a pawl and so on, and the slider 150 can be provided with a corresponding receiving structure.

Figure 2A:
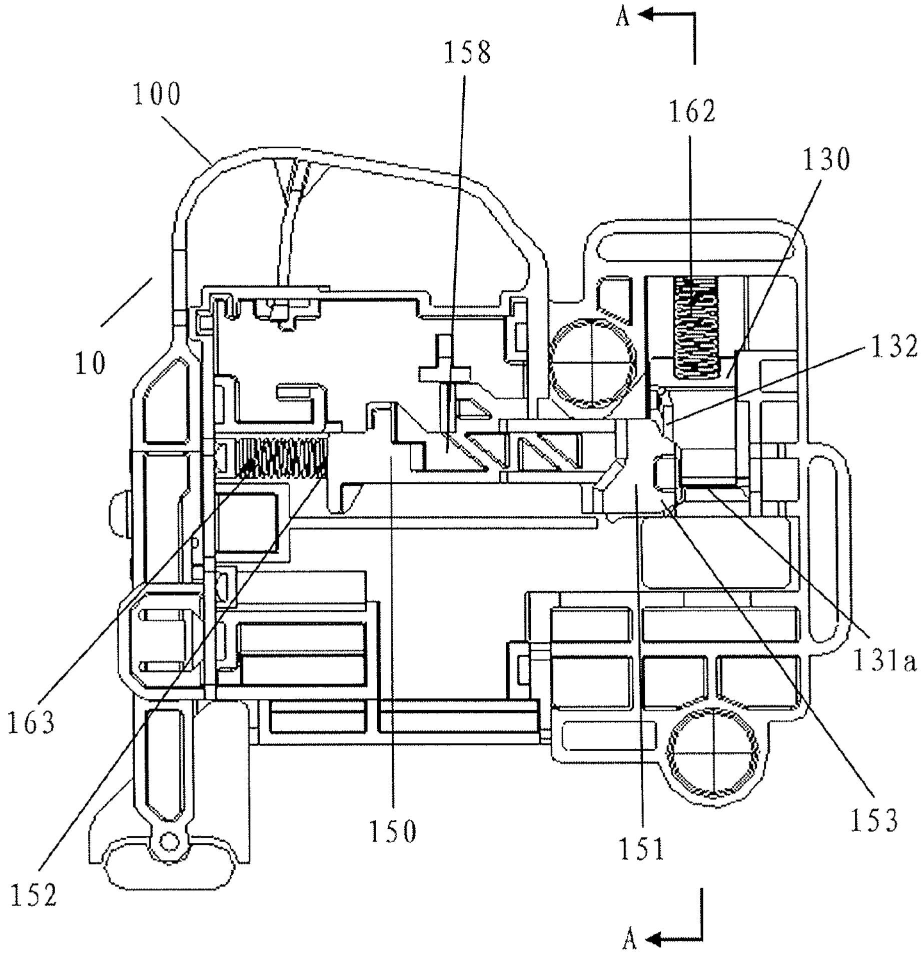
FIG. 2*a* is a top view of the door lock in FIG. 1 showing the door lock in a locked state (the lock hook is not shown)
Figure 2B:
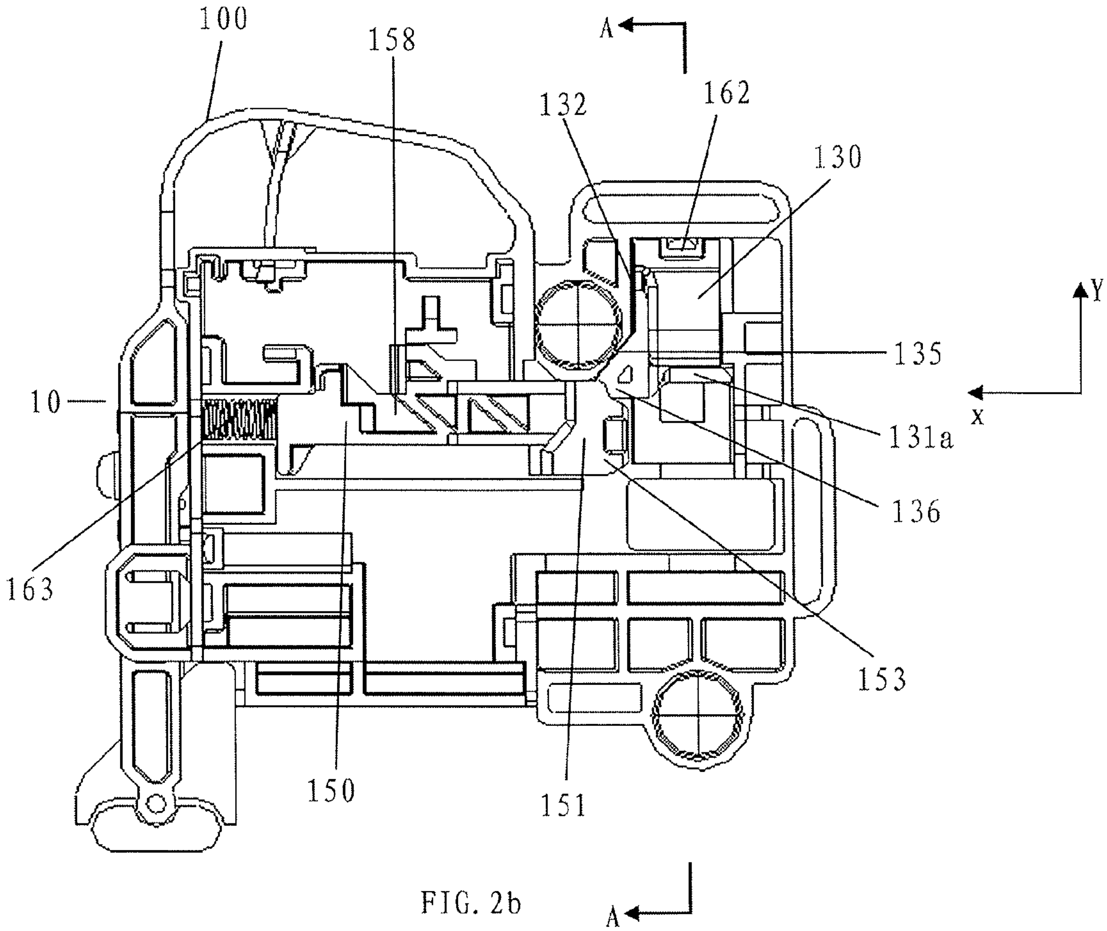
FIG. 2*b* is a top view of the door lock shown in FIG. 1 showing the door lock in an open state (the lock hook is not shown)
Figure 5:
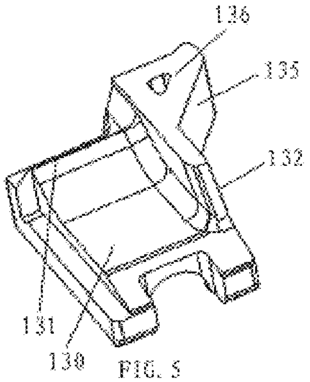
FIG. 5 is a perspective view of the locking slider in the door lock shown in FIG. 1.
Figure 6A:
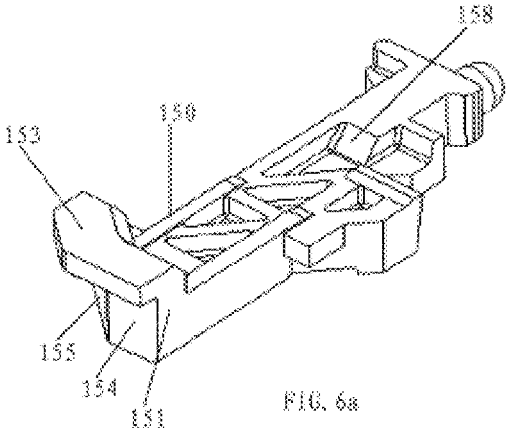
FIG. 6*a* is a perspective view of the slider locking device used in the door lock shown in FIG. 1.
Figure 6B:
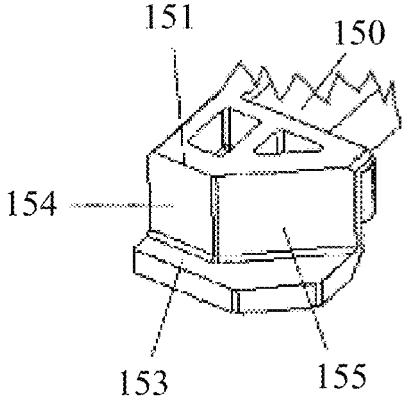
FIG. 6*b* is a perspective view of an end of the slider locking device shown in FIG. 6*a* as viewed from another direction.

FIGS. 2*a*, 2*b* and FIG. 5 show that an oblique surface 135 inclined to the sliding direction of the locking slider 130 is provided on the axial side surface 132 of the locking slider 130 which is contacted by the slider 150. In the embodiment shown in FIG. 5, at the side surface 132 of the locking slider 130 forms an extension portion 136 extending towards one side of the slider 150, the oblique surface 135 is configured on the side of the extension portion 136 which faces the slider 150, and the oblique surface 135 is at an obtuse angle to the side surface 132. Of course, the oblique surface 135 can be arranged in other ways, for example, the locking slider 130 has an inwardly recessed cavity (not shown) configured on the side surface 132, and the locking slider oblique surface 135 is formed on an internal surface of the cavity.

FIGS. 2*a*, 2*b* and FIGS. 6*a* and 6*b* show a structure on the slider 150 for cooperating with the oblique surface 135. A surface 154 which is perpendicular to a movement direction of the slider 150 and an oblique surface 155 which is inclined to the sliding direction of the slider 150 are formed on the outer profile of the end 151 of the slider 150. The oblique surface 155 interacts with the oblique surface 135. The two oblique surfaces may be configured with the same inclined angle so that they may form two complementary contacting surfaces when they abut against each other. Preferably, the two oblique surfaces may be further configured to have the same shape and area. Furthermore, the upper end of the end 151 may be provided with a flange 153 which covers an upper end surface of the locking slider side surface 132.

FIGS. 2*a* and 2*b* further show that at the other end 152 of the slider 150 is provided an elastic member 163 which may be for example a spring as shown in the figure, but may also be other elastic members. An end of the spring 163 abuts against the end 152 of the slider 150, and the other end thereof is abutted against by the housing so as to provide a force for driving or blocking the sliding of the slider 150.

How the door lock of the present invention works will be exemplarily explained with reference to FIGS. 2*a*, 2*b*, 3*a*, 3*b*, 4*a* and 4*b* below.

Figure 3A:
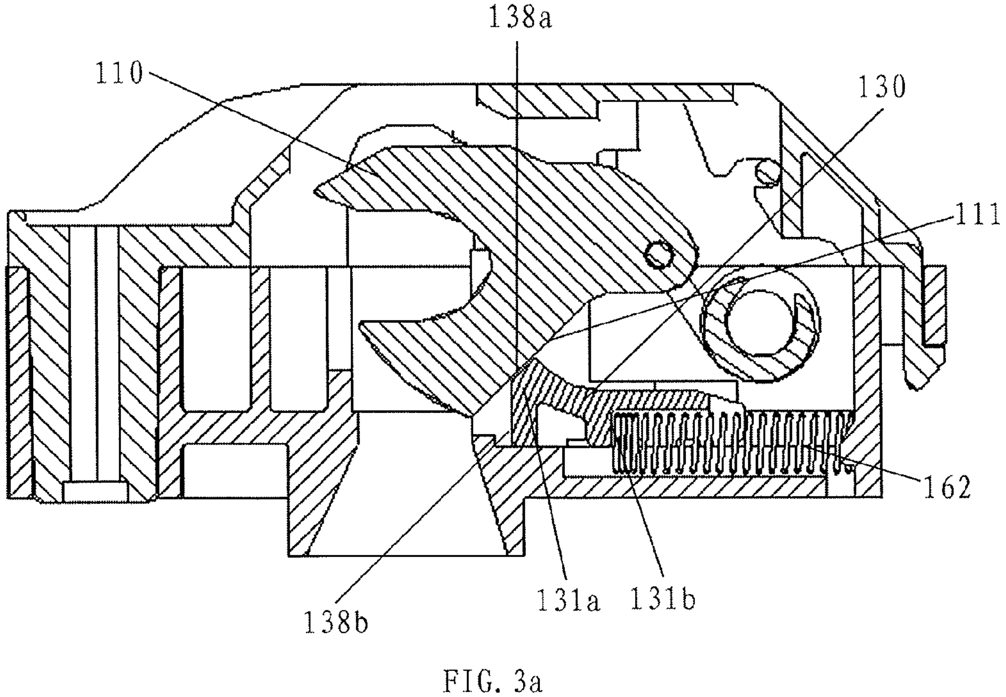
FIG. 3*a* is a cross-sectional view taken along line A-A of the door lock shown in FIG. 2*a* (the lock hook is shown)
Figure 4A:
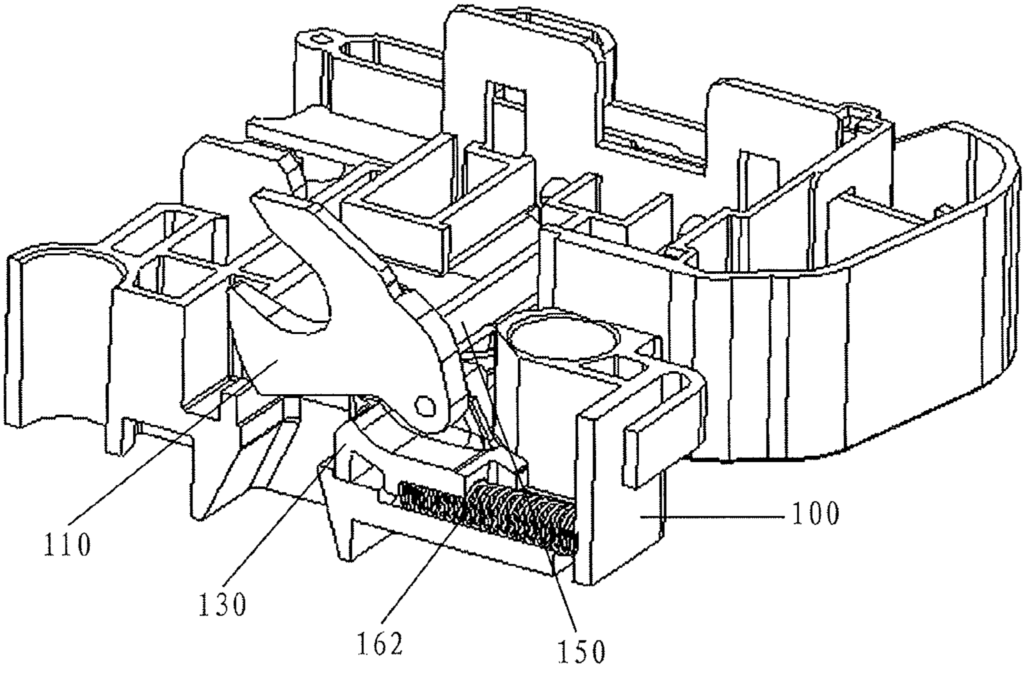
FIG. 4*a* is a perspective view showing the cooperation relationships between the lock hook, the locking slider and the slider locking device when the door lock shown in FIG. 1 is in a locked state.

In FIGS. 2*a*, 3*a* and 4*a*, the lock hook 110 is at the lock hook locked position, the locking slider 130 is at the locking slider locked position, and the slider 150 is at a locked position of the slider locking device.

When the door is closed, the door hook (not shown) is inserted into the door lock, pushing the lock hook to pivot in the clockwise direction of FIG. 3*a* into the lock hook locked position. The locking slider 130 slides to the locking slider locked position shown in FIG. 3*a* under the pushing by the spring 162, while the first lock hook contacting surface 138*a* abuts against the radial surface 111 of the lock hook 110.

As can be seen from FIG. 2*a*, at that moment, the slider 150 slides to the locked position of the slider locking device under the pushing by the spring 163. The end 151 of the slider 150 abuts against the side surface 132 of the slider 130, and its oblique surface 155 abuts against the oblique surface 135 of the slider 130.

The pawl may be configured to cooperate with the notch 158 on the slider 150 to lock the slider 150 at the locking device locked position upon receiving a signal for starting operation of the electrical appliance (other conditions for the pawl to lock the slider 150 of course may be configured as needed) such that the door is locked. At this time, if the door is subjected to a pulling force, the door hook engaging with the lock hook 110 applies a force for pulling the lock hook 110 to pivot away from the lock hook locked position, and the axial surface 111 of the lock hook 110 applies to the locking slider 130 a force enabling the locking slider 130 to move away from the slider locked position so that the locking slider 130 applies to the slider 150 a force enabling the slider 150 to move away from the locked position of the slider locking device. Due to existence of the oblique surface 135 and oblique surface 155, the force applied by the locking slider 130 on the slider 150 via the oblique surface 135 is decomposed into two component of forces, one of which is transverse to the sliding direction of the slider 150 and the other of which is parallel to the sliding direction of the slider 150. The inclined angles of the oblique surfaces 135 and 155 are configured to enable the above transverse component of force to be larger but blocked by the housing 100, whereas enable the parallel component to be smaller but sufficient to be blocked by the bolt or pawl. This enables the door lock of the present invention to bear a larger pulling force for the door even though by using the same bolt or pawl as that in the prior art.

In addition, because the locking slider 130 of the present invention abuts against the radial surface 111 of the lock hook 110 and the sliding direction thereof is parallel to the pivoting plane of the lock hook 110, when applying a pulling force to the locked door, the locking slider 130 only generates a force applying to the lock hook 110 in the radial direction of the lock hook without generating a force parallel to the axial direction of the lock hook. Therefore, even if the door is applied with a very large force, the lock hook will not be damaged or deviate from its position due to subjecting to an axial force, so that the door can actually bear a larger pulling force in the locked state.

Furthermore, in the embodiment shown in the above figures, the oblique surface 135 is provided on the outward extending portion of the locking slider 130 rather than in the cavity configured in the interior of the locking slider 130 so that the dimension and the incline angle of the oblique surface 135 can be set substantially without being limited by the dimensions of the locking slider (for example, the length, height and thickness of the locking slider). Therefore, when the door is designed to bear a larger pulling force in the locked state, the area and incline angle of the oblique surface can be set in a more convenient and effective manner, for example, setting the area of the slant surface 135 to make it larger and adjusting the incline angle of the oblique surface 135, so as to enable the parallel component of force applied on the slider 150 to be still in the bearing extension of the pawl.

Figure 3B:
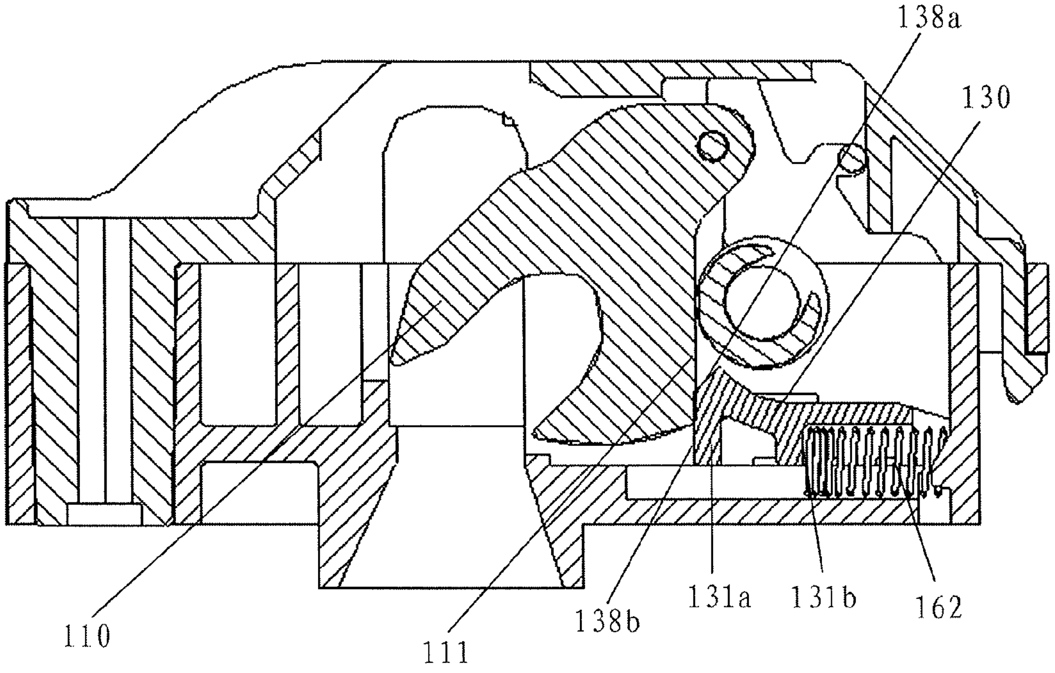
FIG. 3*b* is a cross-sectional view taken along line A-A of the door lock shown in FIG. 2*b* (the lock hook is shown)
Figure 4B:
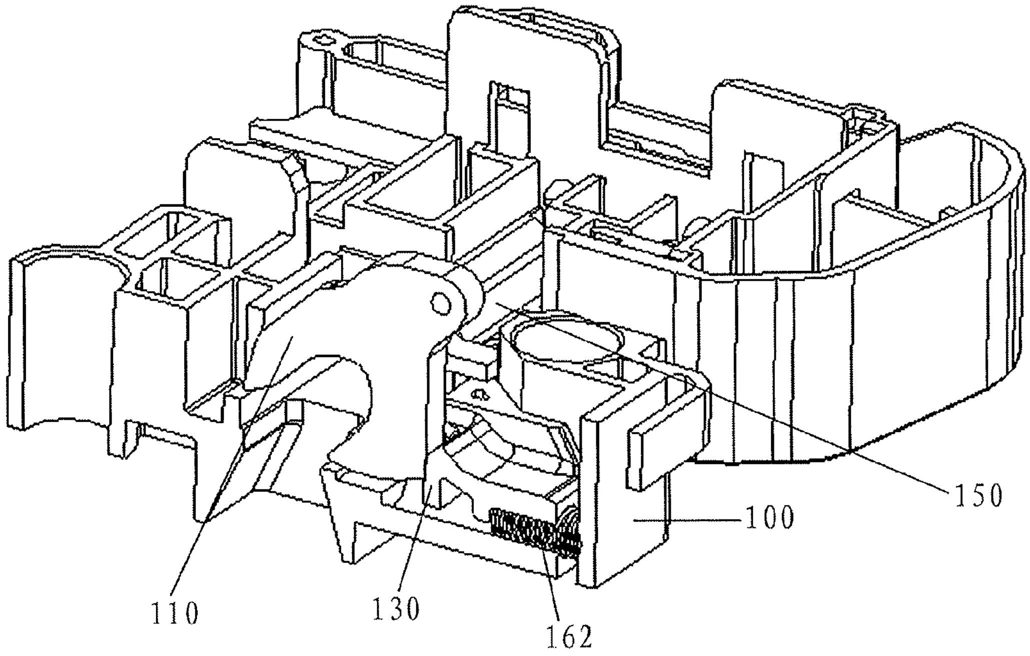
FIG. 4*b* is a perspective view showing the cooperation relationships between the lock hook, the locking slider and the slider locking device when the door lock shown in FIG. 1 is in an open state.

In FIGS. 2*b*, 3*b* and 4*b*, the lock hook 110 is at a lock hook unlocked position, the locking slider 130 is at a locking slider unlocked position, and the slider 150 is at a unlocked position of the slider locking device.

When the closed door is to be opened, the electrical appliance sends a signal indicating unlocking the bolt or pawl so that the locked slider 150 is released and the slider 150 is in a slideable state. At this moment, when the door is applied with a pulling force, the parallel component of force decomposed from the force applied by the locking slider 130 to the slider 150 pushes the slider 150 to slide in the direction shown by an arrow X in FIG. 2*b* to move away from the locked position of the slider locking device so that the locking slider 130 can slide in the direction shown by an arrow Y in FIG. 2*b* to move away from the slider locked position. As such, the door hook (not shown) can pull the lock hook 110 to pivot in a counter-clockwise direction in FIG. 3*b* to move away from the lock hook locked position and finally arrives at the lock hook unlocked position shown in FIG. 3*b*, and the door is opened. During the above course, the radial surface 111 of the lock hook 110 pushes the locking slider 130 away from the locking slider locked position, and the first lock hook contacting surface 138*a* gradually disengages from contacting the lock hook radial surface 111 while the second lock hook contacting surface 138*b* gradually abuts against the radial surface 111. As the locking slider 130 and the slider 150 slide, the oblique surface 135 disengages from contacting the oblique surface 155, and the distal end of the extension portion 136 of the locking slider abuts against the slider 150 so that when the door is in open state, the slider 150 is held by the extension portion 136 and cannot arrive at its locked position, and when the door is closed again, the slider 150 and the locking slider 130 can return to the state shown by FIG. 2*a*.

Because the oblique surface 135 is configured on the locking slider 130 rather than being configured on the lock hook as taught by the prior art, when an outward pulling force is applied on the door, the lock hook is not subjected to the force parallel to the axial of its pivoting plane and would not be damaged or deviate from its position.

Furthermore, the door lock according to the present invention does not increase the space occupied by it as compared with the door lock in the prior art, instead, it flexibly uses the space in the interior of the door lock housing, so that it is also advantageous in compact structure.

Figure 7:
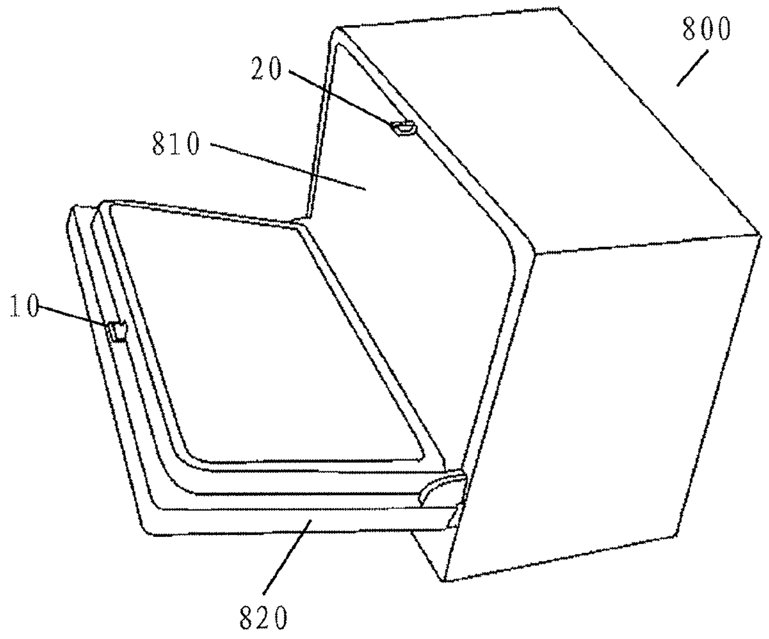
FIG. 7 is a perspective view of a dish-washer mounted with the door lock according to the present disclosure.

FIG. 7 is a perspective view of a dish-washer 800 mounted with the door lock according to the present invention. As shown in the figure, the dish-washer 800 comprises a chamber 810 for receiving bowls or dishes and a front door 820 enclosing the chamber. The front door 820 of the dish-washer is mounted with the door lock 10 disclosed in the present invention. The main body 810 of the dish-washer is mounted with a door hook 20. Of course, the door lock may be mounted on the main body of the dish-washer and the door hook is mounted on the front door of the dish-washer.

The dish-washer in FIG. 7 is only an example. The door lock according to the present invention may also be mounted on any kind of electrical appliance which has a chamber and a door for enclosing the chamber, for example, a washing machine, a clothes dryer, or a microwave oven, or mounted on other non-electrical appliances.

The present invention needs to cooperate with an independent and controllable implementing mechanism or switch box to compose a set of complete door lock. The implementing mechanism or switch box may be an existed module or standard parts.

The above embodiments describe the working principles, exemplary structures and application of the lock device of the present invention with the door lock as an example, but those skilled in the art can appreciate that the lock device of the present invention is not limited to the door lock, and it may be lock device for other applications.

Although the present invention is described with reference to specific embodiments shown in the figures, it should be appreciated that without departing from the spirit and scope taught by the present invention, the lock device of the present invention may have may variations. The parts in different specific embodiments of the present invention can be interchangeable or re-combinable without departing from the spirit and scope taught by the present invention, whereby the obtained lock devices also fall within the protection scope of the present invention. Those having ordinary skill in the art should appreciate that parameters such as dimensions, shapes or types of elements or materials of the disclosed embodiments may be changed in different manners, all falling within the spirit and scope of the present invention and the appended claims.

What is claimed is:

1. A lock device, comprising a housing including:

a lock hook mounted in the housing, the lock hook pivotally moves to and away from a lock hook locked position;

a locking slider for locking the lock hook, the locking slider having a locking slider first end which abuts against a surface of the lock hook, the locking slider is reciprocatingly slideable in a first direction normal to a direction of the lock hook pivoting axis following pivoting of the lock hook to move to or away from a locking slider locked position;

a slider locking device for locking the locking slider, the slider locking device is reciprocatingly slideable in a second direction following the reciprocatingly sliding of the locking slider in the first direction, the second direction crosses a lock hook pivoting plane.

2. The lock device according to claim 1, wherein:

the slider locking device having a slider locking device first end which abuts against a side surface of the locking slider;

a locking slider oblique surface inclined to the first direction is provided on the side surface of the locking slider, and a slider locking device oblique surface which is complementary with the locking slider oblique surface is provided at the first end of the slider locking device locking device oblique surface to decompose the force applied by the locking slider to the slider locking device into two components of force.

3. The lock device according to claim 1, wherein:

when the lock device is locked, the slider locking device is at a slider locking device locked position and locked, the locking slider is at the locking slider locked position, the lock hook is at the lock hook locked position, the slider locking device first end abuts against the locking slider to prevent the locking slider from moving away from the locking slider locked position, the locking slider first end abuts against the lock hook radial surface to prevent the lock hook from rotating away from the lock hook locked position;

when the lock device is opened, the slider locking device is not locked, the locking slider slides away from the locking slider locked position as the lock hook rotates away from the lock hook locked position, a force applied by the locking slider to the slider locking device first end enables the slider locking device to slide away from the slider locking device locked position.

4. The lock device according to claim 2, wherein:

the locking slider having an outward extension portion configured on the side surface which faces the slider locking device, the locking slider oblique surface is formed on the outward extension portion.

5. The lock device according to claim 2, wherein:

the locking slider having an inwardly recessed cavity configured on the side surface which faces the slider locking device, and the locking slider oblique surface is formed on an internal surface of the cavity.

6. The lock device according to claim 1, wherein:

the second direction is perpendicular to the lock hook pivoting plane.

7. The lock device according to claim 1, wherein:

the locking slider first end having a first lock hook contacting surface and a second lock hook contacting surface; when the locking slider is located at the locking slider locked position, the first lock hook contacting surface abuts against the radial surface of the lock hook; as the locking slider slides away from the locking slider locked position, the first lock hook contacting surface gradually disengages from contacting the lock hook radial surface and the second lock hook contacting surface gradually contacts and abuts against the lock hook radial surface.

8. The lock device according to claim 1, wherein:

the housing further comprises a first elastic member mounted on the lock hook, the first elastic member generates a force for driving or blocking the pivoting of the lock hook; and the first elastic member is a torsion spring.

9. The lock device according to claim 8, wherein the housing further comprising:

a second elastic member for driving and blocking the reciprocatingly sliding of the locking slider in the first direction.

10. The lock device according to claim 1, wherein the lock device further comprises:

a locking member which locks the slider locking device at the slider locking device locked position when the lock device is locked.

11. The lock device according to claim 10, wherein:

the locking member is a pawl, and a notch is provided on the slider locking device to receive the pawl.

12. An apparatus, comprising a chamber, a door for enclosing the chamber and a door lock for locking the door, wherein:

the door lock is the lock device according to claim 1; and the apparatus is a household appliance.

13. The lock device according to claim 1, wherein:

the locking slider, when viewed in the direction of the pivoting axis, has a first surface that abuts a first lock hook surface and is parallel with the first lock hook surface when the lock hook is against the lock hook locked position; and the locking slider, when viewed in the direction of the pivoting axis, has a second surface that abuts the lock hook and is parallel with the first lock hook surface when the lock hook is at an unlocked position, the first surface and the second surface being at an oblique angle to one another.

14. The lock device according to claim 1, wherein:

the slider locking is reciprocating slideable in the second direction along a path, wherein the path does not move with the reciprocatingly slideable movement of the locking slider in the first direction.

15. The lock device according to claim 1, wherein:

the lock device is configured so that for normal operation, a pulling force on a door hook engaged with the lock hook causes the lock hook to pivotally move to release the door hook from engagement with the lock hook.

16. The lock device according to claim 1, wherein:

the lock device is configured so that the reciprocatingly slideable movement in the first direction of the locking slider is due entirely to pivoting of the lock hook.

17. The lock device according to claim 1, wherein:

the housing has an opening to receive a door hook into the housing; and the lock device is configured so that sliding of the locking slider to lock the look hook moves the locking slider, relative to a direction of movement of the door hook when the door hook enters and exits the housing, between the opening and the lock hook.

18. The lock device according to claim 1, wherein:

the housing has an opening to receive a door hook into the housing; and the lock device is configured so that the locking slider is, relative to a direction of movement of the door hook when the door hook enters and exits the housing, between the opening and the lock hoop pivoting axis.

19. The lock device according to claim 1, wherein:

the locking slider interfaces with the same surface of the lock hook when the locking slider locks the lock hook and when the lock hook is in an unlocked position.

20. The lock device according to claim 1, wherein:

the locking slider interfaces with a flat surface of the lock hook when the lock hook is in an unlocked position.

21. The lock device according to claim 1, wherein:

the housing has an opening to receive a door hook into the housing; and with respect to a direction of movement of the door hook into the opening, the locking slider pushes the lock hook away from the opening to lock the lock hook at a location between the pivot axis and the opening relative to a direction normal to the direction of movement.

* * * * *